(12) United States Patent
Peng et al.

(10) Patent No.: US 11,217,854 B2
(45) Date of Patent: Jan. 4, 2022

(54) BATTERY CARRIER

(71) Applicants: Inventec (Pudong) Technology Corporation, Shanghai (CN); INVENTEC CORPORATION, Taipei (TW)

(72) Inventors: Ping-Wei Peng, Taipei (TW); Liguo Zhou, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 64 days.

(21) Appl. No.: 16/901,425

(22) Filed: Jun. 15, 2020

(65) Prior Publication Data
US 2021/0296624 A1 Sep. 23, 2021

(30) Foreign Application Priority Data
Mar. 19, 2020 (CN) .......................... 202010198887.5

(51) Int. Cl.
*H01M 50/20* (2021.01)
(52) U.S. Cl.
CPC ........ *H01M 50/20* (2021.01); *H01M 2220/10* (2013.01)

(58) Field of Classification Search
None
See application file for complete search history.

(56) References Cited

U.S. PATENT DOCUMENTS

2007/0273786 A1* 11/2007 Ahn ..................... H04M 1/0235
  348/373
2008/0253065 A1* 10/2008 Lai ........................ G06F 1/1635
  361/679.01

* cited by examiner

*Primary Examiner* — Wyatt P McConnell
(74) *Attorney, Agent, or Firm* — Locke Lord LLP; Tim Tingkang Xia, Esq.

(57) ABSTRACT

A battery carrier configured to hold a battery includes a base and a frame disposed on the base. The base includes a main plate and a first limiter disposed on the main plate. The main plate has a positioning hole located opposite to the first limiter. The frame includes a main part located on the main plate, a tail part disposed to the main part, and a stopper. The main part includes an abutment wall standing on the main plate. The tail part includes a positioning post. The stopper includes an elastic arm disposed on the abutment wall and a block disposed on the elastic arm. The base has a limit edge located between the first limiter and the positioning hole. An extending direction of the limit edge is different from a direction from the first limiter to the positioning hole.

10 Claims, 5 Drawing Sheets

BATTERY CARRIER

CROSS-REFERENCE TO RELATED APPLICATIONS

This non-provisional application claims priority under 35 U.S.C. § 119(a) on Patent Application No(s). 202010198887.5 filed in China, P.R.C. on Mar. 19, 2020, the entire contents of which are hereby incorporated by reference.

BACKGROUND OF THE INVENTION

Technical Field of the Invention

The present disclosure relates to a battery carrier, more particularly to a battery carrier that is easy to be assembled and allows a battery to be easily installed thereon.

Description of the Related Art

Generally, a server can obtain power via a power supply. Considering the power supply may be failed, a backup power supply would be further installed in the server to prevent data loss of the server due to an unwanted failure of the power supply.

The backup power supply may be a battery that is held by a battery carrier installed in the server. However, since the parts are compactly installed inside the server, it is difficult to assemble the battery carrier in the server or install the battery on the battery carrier. Furthermore, if the steps of assembling the battery carrier or installing the battery are too complicated, the time spending on assembling the battery carrier or installing the battery may further increased. Therefore, how to manufacture a battery carrier that is easy to be assembled and allows the battery to be easily installed thereon has become an important issue in the field.

SUMMARY OF THE INVENTION

The present disclosure provides a battery carrier, which is capable of being easily assembled and allowing a battery to be easily installed thereon.

According to one aspect of the present disclosure, a battery carrier configured to hold a battery. The battery carrier includes a base and a frame. The base includes a main plate and a first limiter. The first limiter is disposed on the main plate and configured for the battery to abut thereon. The main plate has a positioning hole located opposite to the first limiter. The frame includes a main part, a tail part and a stopper. The main part is located on the main plate. The main part includes an abutment wall. The abutment wall stands on the main plate and is configured for the battery to abut thereon. The tail part is disposed on a side of the main part located away from the first limiter. The tail part includes a positioning post. The frame is disposed on the base via the insertion of the positioning post into the positioning hole. The stopper includes an elastic arm and a block. The elastic arm is disposed on a side of the abutment wall located away from the main plate. The block is disposed on the elastic arm and protrudes towards the first limiter from the abutment wall. The base has at least one limit edge. The at least one limit edge is located between the first limiter and the positioning hold and configured for the main part to abut thereon. An extending direction of the at least one limit edge is different from a direction from the first limiter to the positioning hole.

According to the battery carrier discussed above, to assemble the frame on the base, the tail part can be held by single hand to make the main part abut at the limit edges and then to make the positioning post of the tail part insert into the positioning hole of the main plate. As such, the frame is assembled on the base. To install the battery on the battery carrier, the battery can be held by single hand to make one end thereof abut on the first limiter of the base and then to make another end of the battery press against and push the block, such that the block is moved away from the first limiter. After the block is moved to be aligned with the abutment wall, the battery can be moved to the accommodation space between the first limiter and the abutment wall, and the first limiter and the abutment wall are able to abut on the two opposite ends of the battery. As such, the battery is installed on the battery carrier, and the movement of the battery between the first limiter and the abutment wall is limited. The steps of assembling the frame on the base or installing the battery on the battery carrier can be easily accomplished by single hand.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
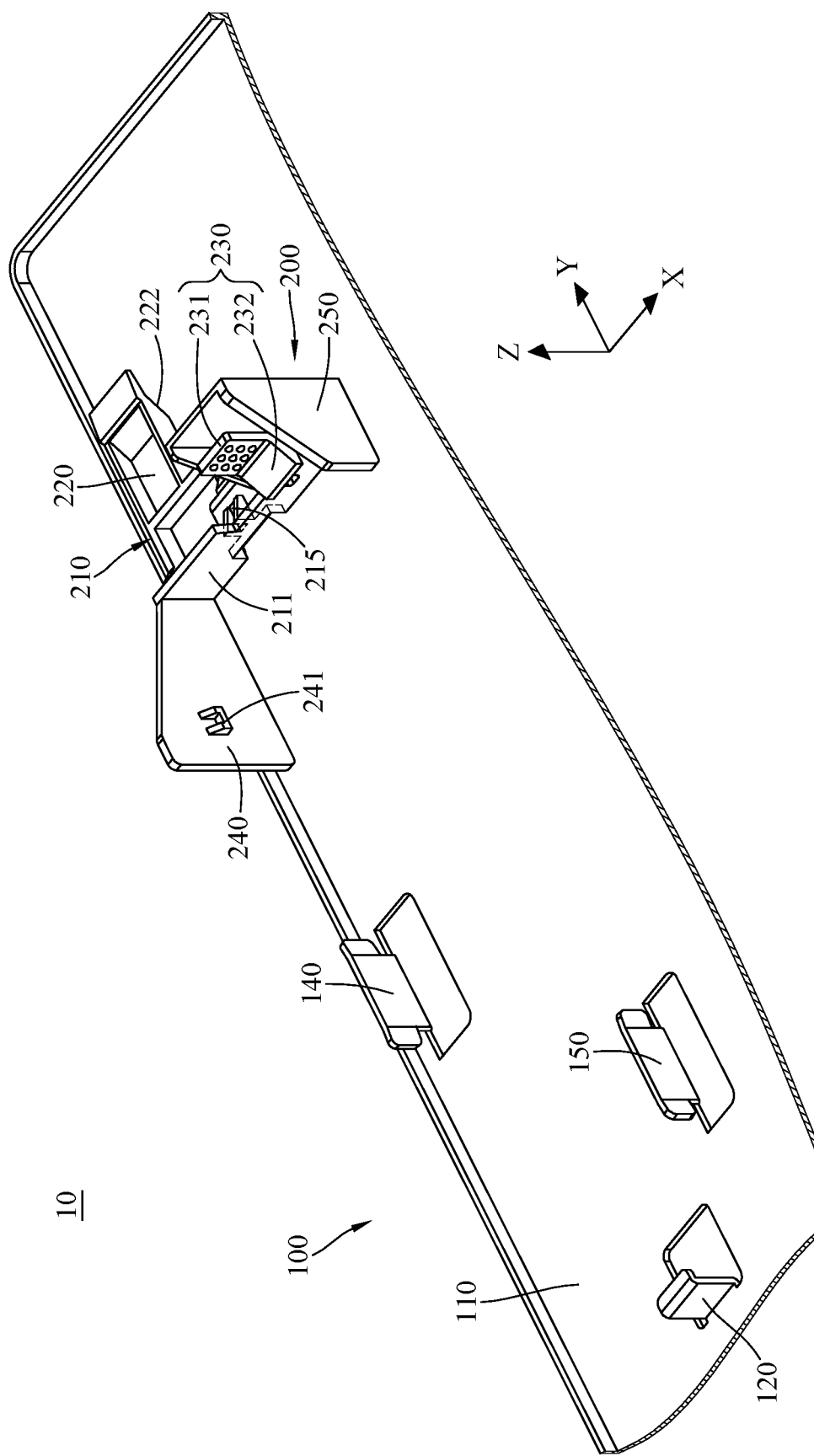
FIG. 1 is a perspective view of a battery carrier according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
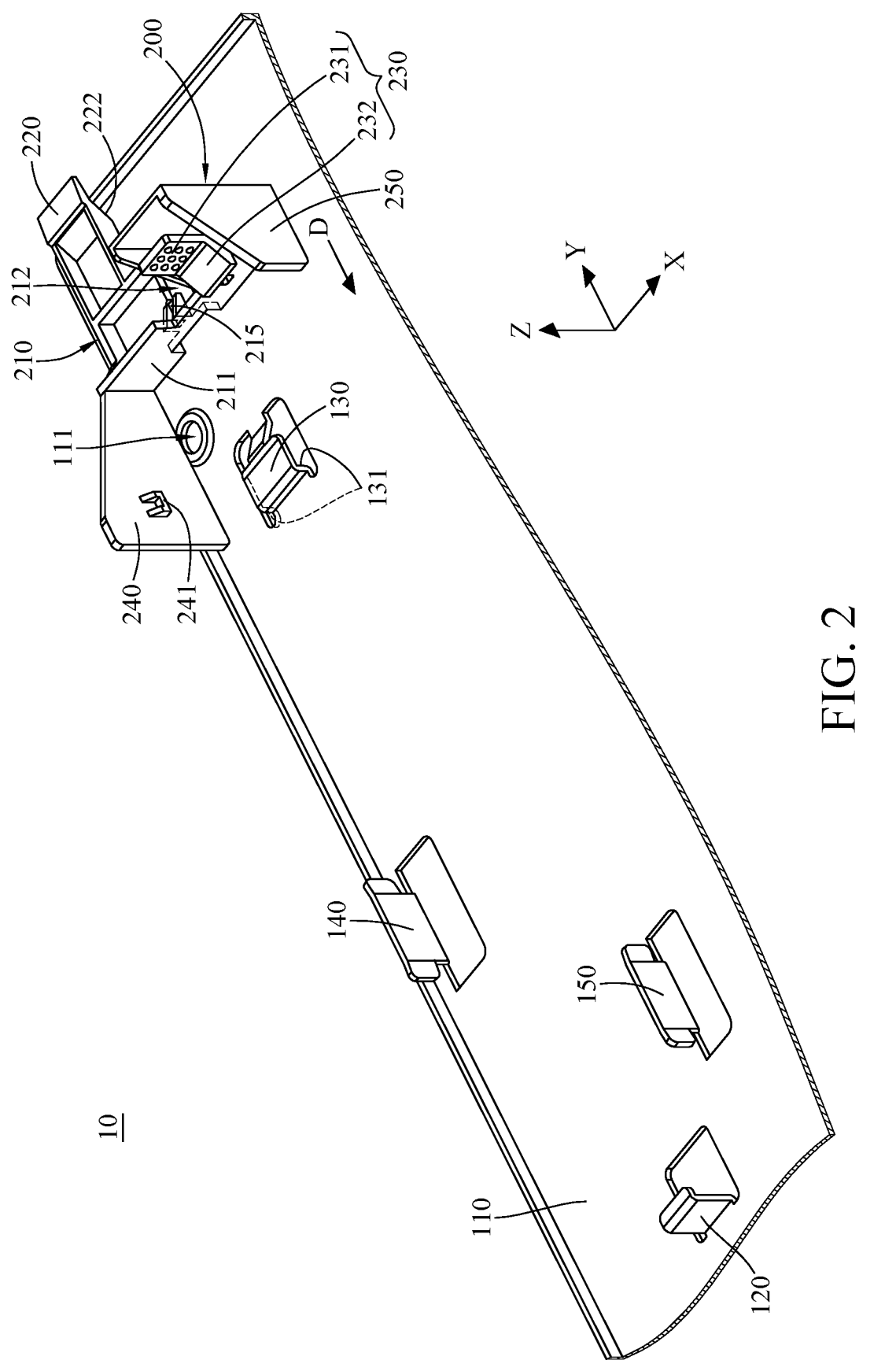
FIG. 2 is an exploded view of the battery carrier in FIG. 1.
Figure 3:
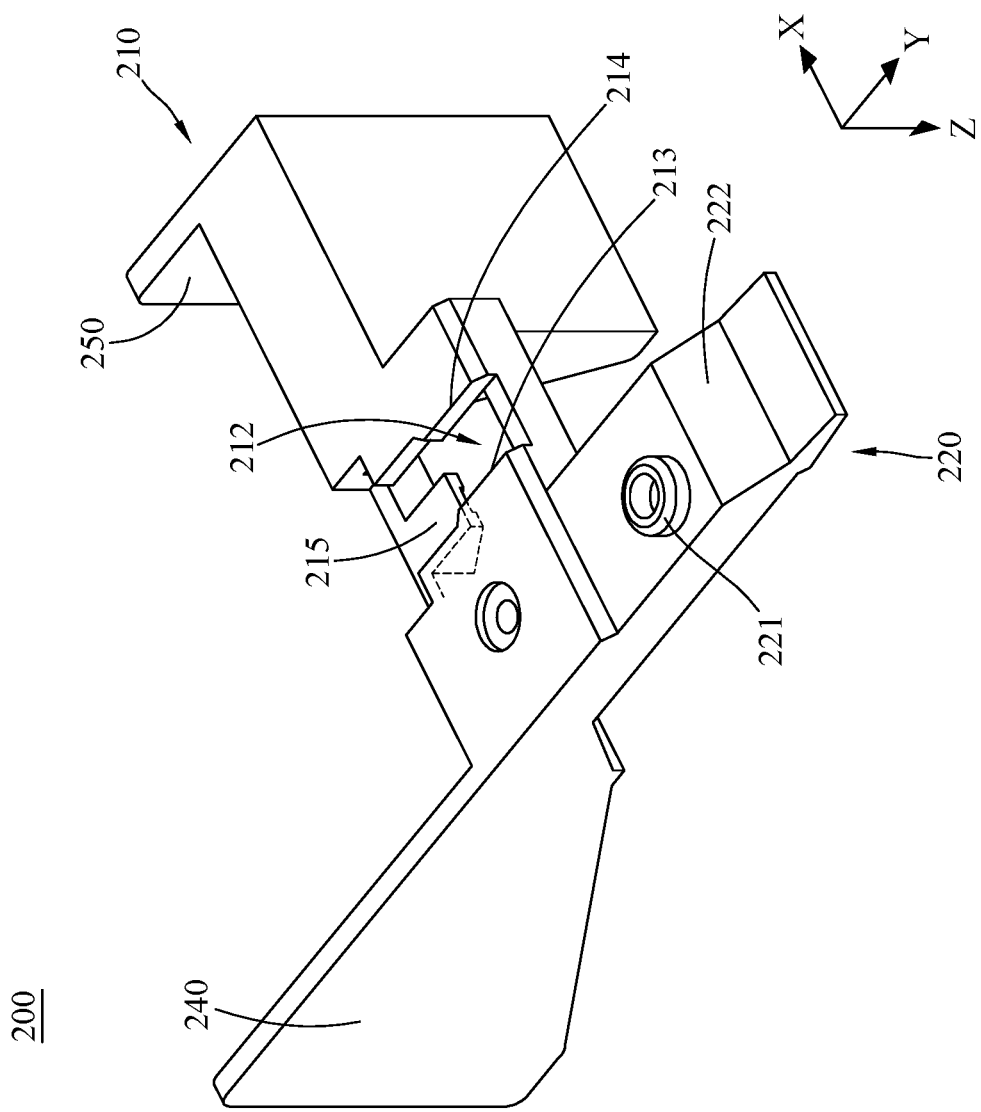
FIG. 3 is another perspective view of a frame of the battery carrier in FIG. 2.

Please refer to FIG. 1 to FIG. 3, where FIG. 1 is a perspective view of a battery carrier 10 according to one embodiment of the present disclosure, FIG. 2 is an exploded view of the battery carrier 10 in FIG. 1, and FIG. 3 is another perspective view of a frame 200 of the battery carrier 10 in FIG. 2.

In this embodiment, the battery carrier 10 is, for example, installed in a server (not shown) and configured to hold a battery 20 (shown in FIGS. 4 and 5), wherein the battery 20 has a substantially rectangular shape and can be a backup power source of the server. The battery carrier 10 includes a base 100 and the frame 200. The base 100 includes a main plate 110 and a first limiter 120. The main plate 110 may be a part of the chassis of the server. The first limiter 120 is disposed on the main plate 110 and configured for the battery 20 to abut thereon. The main plate 110 has a positioning hole 111 located opposite to the first limiter 120. The frame 200 includes a main part 210, a tail part 220, and a stopper 230. The main part 210 is located on the main plate 110. The main part 210 includes an abutment wall 211. The abutment wall 211 stands on the main plate 110 and is configured for the battery to abut thereon. The tail part 220 is disposed on a side of the main part 210 located away from the first limiter 120. The tail part 220 includes a positioning post 221. The frame 200 is disposed on the base 100 via the insertion of the positioning post 221 into the positioning hole 111. The stopper 230 includes an elastic arm 231 and a block 232. The elastic arm 231 is made of, for example, plastic material, such that the elastic arm 231 can be slightly deformed due to the elastic characteristic of plastic material. The elastic arm 231 is disposed on a side of the abutment wall 211 located away from the main plate 110. The block 232 is disposed on the elastic arm 231 and protrudes towards the first limiter 120 from the abutment wall 211. In other words, the elastic arm 231 is disposed above the abutment wall 211, and the block 232 protrudes towards the battery 20.

The base 100 has at least one limit edge 131. The quantity of the at least one limit edge 131 is, for example, two. The limit edges 131 are located between the first limiter 120 and the positioning hole 111 and are configured for the main part 210 to abut thereat. An extending direction (e.g., the positive direction of Z axis as shown in FIG. 2) of the limit edges 131 is different from a direction (e.g., the positive direction of Y axis as shown in FIG. 2) from the first limiter 120 to the positioning hole 111, and a surface (not numbered) located between the two limit edges 131 faces towards the positive direction of Y axis. Specifically, the extending direction of the limit edges 131 is substantially perpendicular to the direction from the first limiter 120 to the positioning hole 111.

To assemble the frame 200 on the base 100, the tail part 220 can be held by single hand to make the main part 210 abut at the limit edges 131 and then to make the positioning post 221 of the tail part 220 insert into the positioning hole 111 of the main plate 110. As such, the frame 200 is assembled on the base 100.

Figure 4:
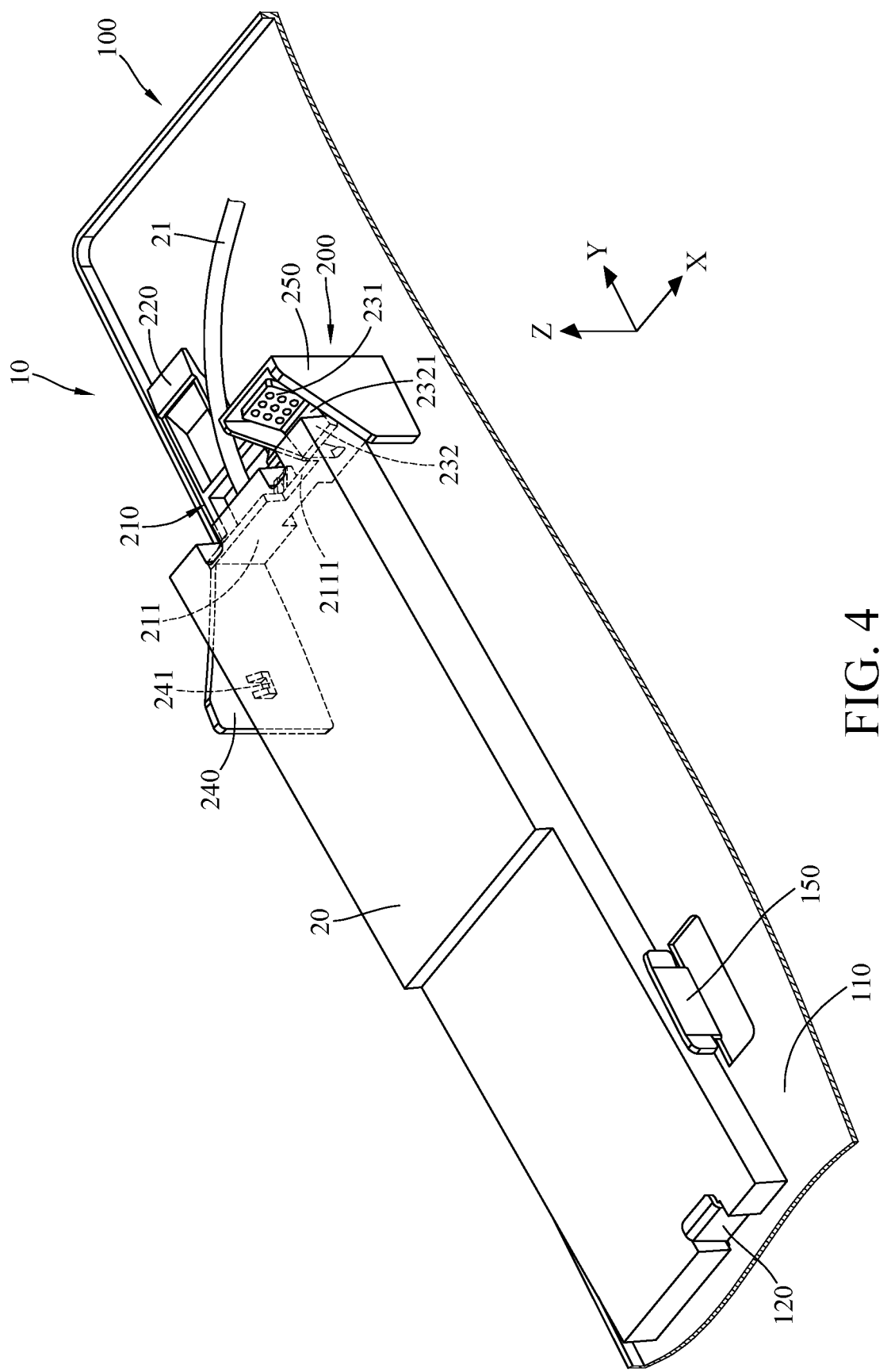
FIGS. 4 and 5 are perspective views of the battery carrier in FIG. 1 while a battery is being installed thereon.
Figure 5:
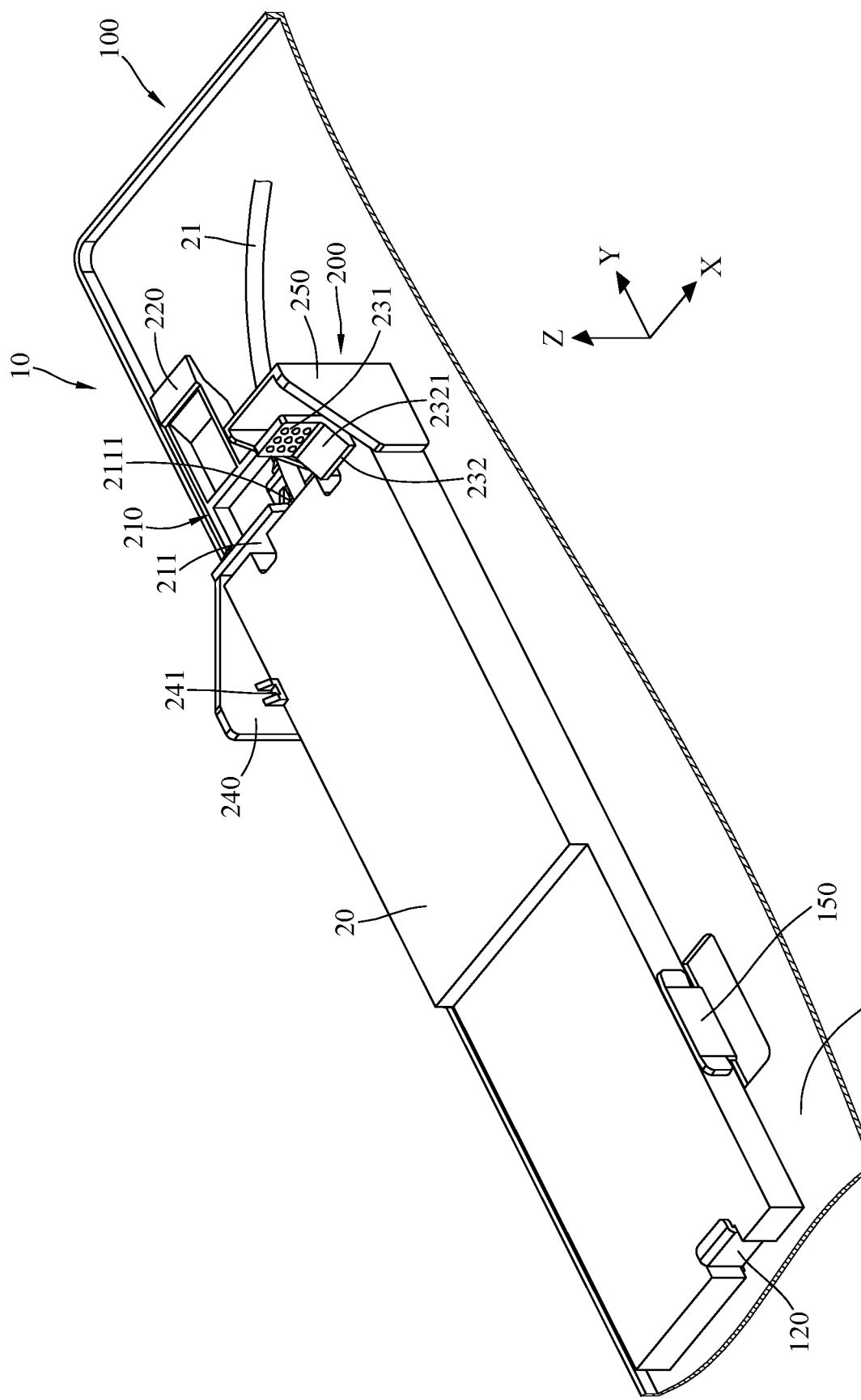

Please further refer to FIGS. 4 and 5, which are perspective views of the battery carrier 10 in FIG. 1 while a battery 20 is being installed thereon. To install the battery 20 on the battery carrier 10, the battery 20 can be held by single hand to make one end thereof abut on the first limiter 120 of the base 100 and then to make another end of the battery 20 press against and push the block 232, such that the block 232 is moved away from the first limiter 120 due to the elastic deformation of the elastic arm 231. After the block 232 is moved to be aligned with the abutment wall 211, the battery 20 can be moved to an accommodation space (not numbered) between the first limiter 120 and the abutment wall 211, and the first limiter 120 and the abutment wall 211 are able to abut on the two opposite ends of the battery 20. As such, the battery 20 is installed on the battery carrier 10, and the movement of the battery 20 between the first limiter 120 and the abutment wall 211 (e.g., two opposite directions of Y axis as shown in FIG. 5) is limited. In detail, in this and some embodiments of the present disclosure, the block 232 has an inclined surface 2321 facing away from the main plate 110 and the abutment wall 211. The inclined surface 2321 of the block 232 can be pressed by the battery 20 during the installation of the battery 20, such that the block 232 can be moved away from the first limiter 120. Therefore, the block 232 would not interfere the installation of the battery 20.

As discussed above, the steps of assembling the frame 200 on the base 100 or installing the battery 20 on the battery carrier 10 can be easily accomplished by single hand.

In addition, after the battery 20 is moved into the accommodation space between the first limiter 120 and the abutment wall 211, the block 232 and the elastic arm 231 can be moved back to the original position thereof due to the elastic characteristic of the elastic arm 231. At this moment, the battery 20 is located between the main plate 110 and the block 232. The block 232 can prevent the battery 20 from being detached from the main plate 110 of the battery carrier 10 due to an unwanted external force, such as vibration or impact.

On the other hand, the stopper 230 can be moved away from the first limiter 120 to detach the battery 20 from the battery carrier 10. In addition, since the elastic arm 231 needs to be forced and moved during the installation and detachment of the battery 20, the elastic arm 231 which is made of plastic material instead of metal material can reduce scrapes generated in the movement of the elastic arm 231 and can prevent a short circuit between electronic components (not shown) inside the server due to the scrapes.

In this and some embodiments of the present disclosure, the tail part 220 includes a ramp 222. The ramp 222 is located away from the main part 210 than the positioning post 221 and faces the main plate 110. The ramp 222 of the tail part 220 and the main plate 110 form a space (not numbered) therebetween. The space is configured to remove the frame 200 from the base 100. In detail, the space is configured for a finger to place therein to force the ramp 222 of the tail part 220 to be moved away from the main plate 110, such that the positioning post 221 is detached from the positioning hole 111 and the tail part 220 can be held so as to remove the frame 200 from the base 100.

In this and some embodiments of the present disclosure, the main part 210 has an opening 212. The opening 212 faces the main plate 110. The base 100 further includes a second limiter 130 disposed on the main plate 110. The limit edges 131 is located on the second limiter 130. The second limiter 130 is disposed through the opening 212. The second limiter 130 and the opening 212 are located between the abutment wall 211 and the tail part 220. The main part 210 has a first edge 213 and a second edge 214 that are opposite to each other at the opening 212. The first edge 213 and the second edge 214 abut at two opposite sides of the second limiter 130. A direction from the first edge 213 to the second edge 214 is different from the direction from the first limiter 120 to the abutment wall 211. Specifically, the direction from the first edge 213 to the second edge 214 is, for example, the positive direction of X axis as shown in the drawings, and the direction from the first limiter 120 to the abutment wall 211 is, for example, the positive direction of Y axis as shown in the drawings, wherein the X axis is substantially parallel to the short-axis of the installed battery 20, and the Y axis is substantially parallel to the long-axis of the installed battery 20. However, the present disclosure is not limited thereto.

As the configuration discussed above, the movement of the frame 200 in two opposite directions of X axis is limited by the first edge 213 and the second edge 214. And, since the positioning post 221 is inserted into the positioning hole 111 and the main part 210 abuts at the limit edges 131, the movement of the frame 200 in two opposite directions of Y axis is also limited. As such, the frame 200 is stably fixed on the base 100. It is noted that the frame 200 would not be held in the whole steps of assembling the frame 200 on the base 100. In detail, the frame 200 may be firstly put on the base 100, then the frame 200 can be slid along a direction D as shown in FIG. 2 (the negative direction of Y axis) to make the main part 210 abut at the limit edges 131, and then the first edge 213 and the second edge 214 can abut on the two opposite sides of the second limiter 130. In the steps, the frame 200 would not be held by hands, which makes the frame 200 is easy to be assembled. However, the present disclosure is not limited thereto. In some embodiments, the frame may be held by hands during the assembly of the frame.

In this and some embodiments of the present disclosure, the main part 210 further includes a protruding part 215. The protruding part 215 is disposed on a side of the abutment wall 211 located away from the first limiter 120. The protruding part 215 abuts on the second limiter 130. The second limiter 130 is located between the protruding part 215 and the main plate 110. The protruding part 215 can limit the second limiter 130 from being overly deformed away from the main plate 110 as the frame 200 is forced too much during the assembly of the frame 200 on the base 100.

In this and some embodiments of the present disclosure, the battery 20 includes a wire 21, and the abutment wall 211 has a through hole 2111. The through hole 2111 faces towards the first limiter 120 and is located between the first limiter 120 and the second limiter 130. After the battery 20 is installed on the battery carrier 10, the wire 21 may pass through the through hole 2111 and extend from a side of the abutment wall 211 located away from the first limiter 120 so as to be connected with other components (not shown) that needs to be powered.

In this and some embodiments of the present disclosure, the base 100 further includes a third limiter 140 and a fourth limiter 150 that are opposite to each other and are disposed on the main plate 110. The third limiter 140 and the fourth limiter 150 are located between the first limiter 120 and the abutment wall 211 and configured for the battery 20 to abut thereon. Accordingly, the movement of the battery 20 in two opposite directions of X axis is limited. In addition, as abovementioned, the movement of the battery 20 in two opposite directions of Y axis is limited by the first limiter 120 and the abutment wall 211, and the movement of the battery 20 away from the main plate 110 of the battery carrier 10 (e.g., the positive direction of Z axis as shown in FIG. 5) is also limited by the block 232. Therefore, the battery 20 is stably fixed on the battery carrier 10.

In this and some embodiments of the present disclosure, the frame 200 further includes a first side plate 240 and a second side plate 250. The first side plate 240 and the second side plate 250 are disposed on two opposite sides of the main part 210 and have at least part located closer to the first limiter 120 than the abutment wall 211. A distance between the first side plate 240 and the second side plate 250 is substantially equal to a distance between the third limiter 140 and the fourth limiter 150. In other words, the battery 20 also abuts on the first side plate 240 and the second side plate 250. Similarly, the movement of the battery 20 in two opposite directions of X axis is also limited by the first side plate 240 and the second side plate 250. In addition, during the installation of the battery 20 on the battery carrier 10, the inner surfaces of the first side plate 240 and the second side plate 250 can guide the battery 20, such that the battery 20 can be smoothly and accurately moved into the accommodation space between the abutment wall 211 and the first limiter 120.

In this and some embodiments of the present disclosure, the first side plate 240 is made of, for example, plastic material. The first side plate 240 may include an extending protrusion 241 that extends towards the second side plate 250. A distance between the extending protrusion 241 and the main plate 110 is greater than a thickness of the battery 20. Similar to the abovementioned elastic arm 231 that is made of plastic material and can be slightly deformed, during the installation of the battery 20, the battery 20 would press against and push the extending protrusion 241 so as to slightly deform the first side plate 240, and thus the extending protrusion 241 would not interfere the installation of the battery 20. Moreover, after the battery 20 is installed on the battery carrier 10, the extending protrusion 241 can also limit the movement of the battery 20 away from the main plate 110 of the battery carrier 10.

According to the battery carrier discussed above, to assemble the frame on the base, the tail part can be held by single hand to make the main part abut at the limit edges and then to make the positioning post of the tail part insert into the positioning hole of the main plate. As such, the frame is assembled on the base. To install the battery on the battery carrier, the battery can be held by single hand to make one end thereof abut on the first limiter of the base and then to make another end of the battery press against and push the block, such that the block is moved away from the first limiter. After the block is moved to be aligned with the abutment wall, the battery can be moved to the accommodation space between the first limiter and the abutment wall, and the first limiter and the abutment wall are able to abut on the two opposite ends of the battery. As such, the battery is installed on the battery carrier, and the movement of the battery between the first limiter and the abutment wall is limited. The steps of assembling the frame on the base or installing the battery on the battery carrier can be easily accomplished by single hand.

In some embodiments, the main part has an opening 212, the main part has a first edge and a second edge that are opposite to each other at the opening, and the base further includes a second limiter. The first edge and the second edge abut at two opposite sides of the second limiter. As such, the movement of the frame in two opposite directions of the short-axis of the battery is limited by the first edge and the second edge. And, since the positioning post is inserted into the positioning hole and the main part abuts at the limit edges, the movement of the frame in two opposite directions of the long-axis of the battery is also limited. As such, the frame is stably fixed on the base.

In some embodiments, the main part further includes a protruding part. The protruding part can limit the second limiter from being overly deformed away from the main plate 110 as the frame is forced too much during the assembly of the frame on the base 100.

In some embodiments, the battery includes a wire, and the abutment wall has a through hole. After the battery is installed on the battery carrier, the wire may pass through the through hole and extend from a side of the abutment wall located away from the first limiter so as to be connected with other components that needs to be powered.

In some embodiments, the base further includes a third limiter and a fourth limiter configured for the battery to abut thereon. Accordingly, the movement of the battery in two opposite directions of the short-axis of the battery is limited. In addition, the movement of the battery in two opposite directions of the long-axis is limited by the first limiter and the abutment wall, and the movement of the battery away from the main plate of the battery carrier is also limited by the block. Therefore, the battery is stably fixed on the battery carrier.

In some embodiments, the frame further includes a first side plate and a second side plate. The battery also abuts on the first side plate and the second side plate. Similarly, the movement of the battery in two opposite directions of the short-axis is also limited by the first side plate and the second side plate. In addition, during the installation of the battery on the battery carrier, the inner surfaces of the first side plate and the second side plate can guide the battery, such that the battery can be smoothly and accurately moved into the accommodation space between the abutment wall and the first limiter.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A battery carrier, configured to hold a battery, the battery carrier comprising:
    a base, comprising a main plate and a first limiter, wherein the first limiter is disposed on the main plate and configured for the battery to abut thereon, and the main plate has a positioning hole located opposite to the first limiter; and
    a frame, comprising a main part, a tail part and a stopper, wherein the main part is located on the main plate, the main part comprises an abutment wall, the abutment wall stands on the main plate and is configured for the battery to abut thereon, the tail part is disposed on a side of the main part located away from the first limiter, the tail part comprises a positioning post, the frame is disposed on the base via the insertion of the positioning post into the positioning hole, the stopper comprises an elastic arm and a block, the elastic arm is disposed on a side of the abutment wall located away from the main plate, and the block is disposed on the elastic arm and protrudes towards the first limiter from the abutment wall,
    wherein the base has at least one limit edge, the at least one limit edge is located between the first limiter and the positioning hole and configured for the main part to abut thereat, and an extending direction of the at least one limit edge is different from a direction from the first limiter to the positioning hole.

2. The battery carrier according to claim 1, wherein the main part has an opening facing the main plate, the base further comprises a second limiter, the second limiter is disposed on the main plate and disposed through the opening, the second limiter and the opening are located between the abutment wall and the tail part, the main part has a first edge and a second edge that are opposite to each other at the opening, the first edge and the second edge abut at two opposite sides of the second limiter, and a direction from the first edge to the second edge is different from the direction from the first limiter to the abutment wall.

3. The battery carrier according to claim 2, wherein the main part further comprises a protruding part, the protruding part is disposed on a side of the abutment wall located away from the first limiter, the protruding part abuts on the second limiter, and the second limiter is located between the protruding part and the main plate.

4. The battery carrier according to claim 2, wherein the abutment wall has a through hole, and the though hole faces towards the first limiter and is located between the first limiter and the second limiter.

5. The battery carrier according to claim 2, wherein the base further comprises a third limiter and a fourth limiter that are opposite to each other and are disposed on the main plate, and the third limiter and the fourth limiter are located between the first limiter and the abutment wall and configured for the battery to abut thereon.

6. The battery carrier according to claim 1, wherein the frame further comprises a first side plate and a second side plate that are disposed on two opposite sides of the main part and have at least part located closer to the first limiter than the abutment wall.

7. The battery carrier according to claim 6, wherein the first side plate comprises an extending protrusion that extends towards the second side plate, and a distance between the extending protrusion and the main plate is greater than a thickness of the battery.

8. The battery carrier according to claim 1, wherein the block has an inclined surface facing away from the main plate and the abutment wall, and the inclined surface is configured to be pressed to be moved away from the first limiter.

9. The battery carrier according to claim 1, wherein the elastic arm is made of plastic material.

10. The battery carrier according to claim 1, wherein the tail part comprises a ramp, and the ramp is located away from the main part than the positioning post and faces the main plate.

* * * * *